United States Patent [19]

Bahal

[11] 3,855,411

[45] Dec. 17, 1974

[54] METHOD OF STABILIZATION OF 6-(1-AMINOCYCLOHEXANECARBOX-AMIDO) PENICILLANIC ACID AND RESULTANT COMPOSITIONS

[75] Inventor: Surendra M. Bahal, Audubon, Pa.

[73] Assignee: American Home Products Corporation, New York, N.Y.

[22] Filed: Nov. 3, 1972

[21] Appl. No.: 303,562

[52] U.S. Cl. ................................. 424/176, 424/271
[51] Int. Cl. ............................................. A61k 21/00
[58] Field of Search ............................ 424/271, 176

[56] References Cited
UNITED STATES PATENTS

| | | | |
|---|---|---|---|
| 2,669,563 | 2/1954 | Ruskin | 424/176 |
| 3,194,802 | 7/1965 | Alburn et al. | 260/239.1 |
| 3,317,389 | 5/1967 | Granatek et al. | 424/271 |
| 3,553,201 | 1/1971 | Clark et al. | 424/271 |

Primary Examiner—Jerome D. Goldberg
Attorney, Agent, or Firm—Joseph Martin Weigman

[57] ABSTRACT

The formation of hydrate of anhydrous 6-(1-aminocyclohexanecarboxamido)penicillanic acid may be avoided by the addition of about 70–80 percent w/v of sucrose at pH 4 to 6.5. The invention is useful in extending the shelf life of aqueous dosage forms of anhydrous 6-(1-aminocyclohexanecarboxamido)-penicillanic acid.

3 Claims, No Drawings

METHOD OF STABILIZATION OF 6-(1-AMINOCYCLOHEXANECARBOXAMIDO) PENICILLANIC ACID AND RESULTANT COMPOSITIONS

This invention relates to method of stabilization of aqueous suspensions of anhydrous, hydrate-forming 6-(1-aminocyclohexanecarboxamido)penicillanic acid and to the resulting compositions. The stabilized compositions may be stored under all required temperature conditions, and particularly at about 2° to 30 °C., without substantial changes in the physical properties of the suspension due to the formation of the hydrate. More particularly the invention is directed to aqueous suspensions of anhydrous 6-(1-aminocyclohexanecarboxamido)penicillanic acid stabilized at about 5° to 25° C. by the addition of sucrose and buffering to about pH 4 to 6.5.

It is known that certain drugs such as 6-(1-aminocyclohexanecarboxamido) penicillanic acid, exist both as the anhydrous and hydrated forms. When aqueous suspension formulations of the anhydrous 6-(1-aminocyclohexanecarboxamido)penicillanic acid are stored, it has a tendency to show crystal growth, either macroscopically or microscopically or both, and other associated physical changes in the product. These changes have been shown to be due to the formation of the thermodynamically more stable crystal form, the dihydrate form. It has been shown that the hydrated form of 6-(1-aminocyclohexanecarboxamido) penicillanic acid is thermodynamically the more stable crystal form at the normal storage temperature for pharmaceutical suspensions. This means that anhydrous 6-(1-aminocyclohexanecarboxamido) penicillanic acid aqueous suspensions formulated according to the present practice in the art will tend to convert to the more stable hydrate form below the transition temperature of 6-(1-aminocyclohexanecarboxamido)penicillanic acid. The transition temperature is the temperature at which both forms are thermodynamically stable. The transition temperature is 61°C. for 6-(1-aminocyclohexanecarboxamido) penicillanic acid [Poole and Bahal, J. Pharm. Sci., 59, 1265 (1970)]. Because the transition temperature is well above that of normal storage conditions for the products, the conversion to the hydrated form will occur when the suspensions are stored at either room temperature, about 20°-25°C., or under refrigerated conditions, about 2°-15°C.

Changes in the crystal form of anhydrous 6-(1-aminocyclohexanecarboxamido) penicillanic acid are undesirable because this will affect its solubility and resultant physical properties of the pharmaceutical suspensions. The shelf life of an anhydrous 6-(1-aminocyclohexanecarboxamido) penicillanic acid suspension is about 2 to 3 weeks following reconstitution from the dry powder form in which it is marketed. It is during this period of shelf life that maintenance of the anhydrous form is essential. The dry powders for reconstitution commonly contain numerous pharmaceutical additives such as colors, flavors, buffers, sweeteners, etc. but according to the present practice in the art, the level and type of additives do not prevent the conversion of anhydrous 6-(1-aminocyclohexanecarboxamido) penicillanic acid to its hydrated form.

It is an object of the present invention to provide methods for the stabilization of anhydrous 6-(1-aminocyclohexanecarboxamido) penicillanic acid in aqueous suspensions.

It is a further object of the present invention to provide methods for retarding the conversion of anhydrous 6-(1-aminocyclohexanecarboxamido)penicillanic acid to its hydrated form.

It is a particular object of the present invention to provide methods for the improvement of shelf life of aqueous suspensions of anhydrous 6-(1-aminocyclohexanecarboxamido) penicillanic acid.

It is still another object of the present invention to provide aqueous compositions of anhydrous 6-(1-aminocyclohexanecarboxamido) penicillanic acid which are stabilized against hydrate formation.

It is a further object of the present invention to prevent the crystal growth and conversion to hydrate in aqueous suspension formulations of anhydrous 6-(1-aminocyclohexanecarboxamido)penicillanic acid.

It is a particular object of the present invention to provide stabilized dosage forms of aqueous suspensions of anhydrous 6-(1-aminocyclohexanecarboxamido)-penicillanic acid which will have improved physical stability throughout their shelf life.

It has been found that the conversion of hydrateforming anhydrous penicillin to the hydrated form, when in aqueous suspensions, may be prevented by the use of suitable concentrations of sucrose at the product pH of about 4.0 to 6.5, preferably 5.0-6.0. Preferred concentration for the sucrose is 70–86 percent w/v sucrose.

The mechanism by which sucrose prevents anhydrous 6-(1-aminocyclohexanecarboxamido)penicillanic acid hydration is not completely understood, and without wishing to be bound by a theory of operation, the initial postulation is that the solute lowers the solubility of anhydrous 6-(1-aminocyclohexanecarboxamindo)penicillanic acid, and that the lower solubility stabilizes the suspension by virtue of the fact that the solubility of the anhydrous species approaches the lower solubility of the hydrated form to a sufficient extent to increase the free energy required for conversion to the hydrate.

It has been found that dissolution of a solute in the concentrations and the types usually used in pharmaceutical products will not produce the desired result.

Between 70 and 80 percent w/v concentration range of sucrose has been found effective at 5° and 25° C. at pH 4, 5, 5.5 and 6.5

In order to disclose more clearly the nature of the present invention, specific examples of the practice of the invention are hereinafter given. It should be understood, however, that this is done solely by way of example and is intended neither to delineate the scope of the invention nor limit the ambit of the appended claims.

EXAMPLE

This example illustrates the use of a high level of sucrose to prevent the conversion of anhydrous 6-(1-aminocyclohexanecarboxamide)penicillanic acid to the hydrated form in aqueous formulations.

A dry powder is prepared from each of the following recipes:

| INGREDIENT | CONTROL | A. | B. | C. | D. |
|---|---|---|---|---|---|
| Anhydrous 6-(1-aminocyclohexane-carboxamido)penicilanic acid | 2.00 Gm. or 4.00 Gm. | 2.00 Gm. or 4.00 Gm. | 2.00 Gm. or 4.00 Gm. | 2.00 Gm. or 4.00 Gm. | 2.00 Gm. or 4.00 Gm. |
| Sodium Benzoate | 0.40 Gm. | 0.40 Gm. | 0.40 Gm. | 0.40 Gm. | 0.40 Gm. |
| Sodium Citrate | 0.15 Gm. | 0.15 Gm. | 0.15 Gm. | 0.15 Gm. | 0.15 Gm. |
| Propylparaben | 0.008 Gm. | 0.008 Gm. | 0.008 Gm. | 0.008 Gm. | 0.008 Gm. |
| Methylparaben | 0.08 Gm. | 0.08 Gm. | 0.08 Gm. | 0.08 Gm. | 0.08 Gm. |
| Sucrose | — | 20.00 Gm. | 40.00 Gm. | 56.00 Gm. | 64.00 Gm. |
| Sucrose Concentration | (0% w/v) | (25% w/v) | (50% w/v) | (70% w/v) | (80% w/v) |

More sodium citrate or citric acid was added to adjust the pH to desired value.

The ingredients are mixed with water to make 80 milliliters (ml.) of the final suspension.

One group of samples is stored at room temperature (25° ± 2° C.) and a second group of samples is stored under refrigerated conditions at a temperature of 5° ± 2°C. The samples were viewed microscopically initially and at different intervals for up to 2 weeks. Any hydrate formation was noted by the appearance of needle agglomerates or long needles under the microscope which is characteristic of hydrate formation with 6-(1-aminocyclohexanecarboxamido)penicillanic acid. The Differential Thermal Analysis Method (DTA) was used as a test for the presence of hydrated 6-(1-aminocyclohexanecarboxamido) penicillanic acid in selected samples. The DTA were carried out using the Dupont Model 900 DTA apparatus to confirm microscopic results. The limit of detection was 10 percent hydrate. The results are shown below in Tables I and II for products containing 2 Gm. of 6-(1-aminocyclohexanecarboxamido)penicillanic acid per 80 ml. Essentially similar results were obtained using 4 Gm. of the penicillin, except that initially the product without sucrose (control) was a homogeneous suspension rather than a solution.

As illustrated in Table I the preparations do not show, physically or microscopically, any crystal growth or the presence of the hydrated antibiotic under either room temperature or refrigerated storage conditions over at least a three week period where high amounts of sucrose are used. In the controls which used no sucrose and the sample containing 25 – 50 percent w/v of sucrose, crystal growth is observed both physically and microscopically under refrigerated or room temperature storage. No such changes occurred in the high sucrose (80 percent) formulations which also showed the absence of the hydrate when tested by DTA.

Based on the foregoing experiments, more than 50 percent w/v sucrose concentrations are required to inhibit or prevent the crystal changes. Sucrose concentrations of about 70 percent w/v show only minor growth at refrigerated temperature but none at room temperature. However, at 80 percent w/v sucrose level, no crystal changes are noted physically, microscopically, and no hydrate was detected by DTA at pH 5.5. The data is summarized in Table II.

Accordingly, an operative limit of about 80 percent w/v sucrose, or greater, is the preferred range for stabilization of 6-(1-aminocyclohexanecarboxamido)-penicillanic acid at a product pH of about 5.5 for storage under either room temperature or refrigerated conditions.

TABLE I

Effect OF SUCROSE AT pH 5.5

| SUCROSE % w/v | STORAGE TEMP. °C. | INITIAL PHYSICAL | INITIAL MICROSCOPIC | AFTER 7 DAYS PHYSICAL | AFTER 7 DAYS MICROSCOPIC | AFTER 14 DAYS PHYSICAL | AFTER 14 DAYS MICROSCOPIC | AFTER 21 DAYS PHYSICAL | AFTER 21 DAYS MICROSCOPIC |
|---|---|---|---|---|---|---|---|---|---|
| 0 (Control) | 5 | C.S. | C.S. | Growth | Growth | N.T. | N.T. | N.T. | N.T. |
| 25 | 5 | H.S. | H.S. | Growth | Growth | N.T. | N.T. | N.T. | N.T. |
| 50 | 5 | H.S. | H.S. | Growth | Growth | N.T. | N.T. | N.T. | N.T. |
| 70 | 5 | H.S. | H.S. | Some Growth | Some Growth | N.T. | N.T. | N.T. | N.T. |
| 80 | 5 | H.S. | H.S. | N.C. | N.C. | N.C. | N.C. | N.C. | N.C. |
| 0 (Control) | 25 | C.S. | C.S. | Growth | Growth | N.T. | N.T. | N.T. | N.T. |
| 25 | 25 | H.S. | H.S. | Growth | Growth | N.T. | N.T. | N.T. | N.T. |
| 50 | 25 | H.S. | H.S. | Growth | Growth | N.T. | N.T. | N.T. | N.T. |
| 70 | 25 | H.S. | H.S. | N.C. | N.C. | N.C. | N.C. | N.C. | N.C. |
| 80 | 25 | H.S. | H.S. | N.C. | N.C. | N.C. | N.C. | N.C. | N.C. |

C.S. = Clear Solution
N.T. = Not Tested
N.C. = No Change
H.S. = Homogeneous Suspension

TABLE II

CONCENTRATION OF SUCROSE REQUIRED TO PREVENT GROWTH MICROSCOPICALLY AT VARIOUS pH VALUES

| pH 4.0 | | | | pH 5.0 | | | | pH 5.5 | | | | pH 6.5 | | | |
|---|---|---|---|---|---|---|---|---|---|---|---|---|---|---|---|
| 5°C | | 25°C | | 5°C | | 25°C | | 5°C | | 25°C | | 5°C | | 25°C | |
| Min. | Pref. | Min. | Pref. | Min. | Pref. | Min. | Pref. | Min. | Pref. | Min. | Pref. | Min. | Pref. | Min. | Pref. |
| >70 | 80 | 70 | 80 | >70 | 80 | 70 | 80 | >70 | 80 | 70 | 80 | >70 | 80 | 70 | 80 |

Symbol > means "more than"

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

For instance as will appear from the foregoing, various modifications of the foregoing, employing the invention are possible within the scope thereof as defined by the appended claims so long as the advantages of the invention with respect to conversion to hydrated forms and physical stability are attained. In addition it should be noted that the variations given above and in the claims are those tested in laboratories.

What is claimed is:

1. A stabilized aqueous suspension comprising:
   A. At least 2.5 to 10 percent w/v of anhydrous 6-(1-aminocyclohexanecarboxamido) penicillanic acid;
   B. about 70–86 percent w/v of sucrose; and
   C. A buffer adjusting the pH to a range between about 4 to 6.5.

2. A stabilized aqueous suspension as described in claim 1 in which the concentration of the 6-(1-aminocyclohexanecarboxamido)penicillanic acid is 2.5 to 5 percent w/v.

3. A Stabilized aqueous suspension comprising:
   A. 2.5 to 10 percent of anhydrous 6-(1-aminocyclohexanecarboxamido) penicillanic acid;
   B. From 80 to 86 percent w/v of sucrose; and
   C. A buffer adjusting the pH to a range between about 4.0 to 6.5.

* * * * *